United States Patent [19]

Regier

[11] 3,876,012
[45] Apr. 8, 1975

[54] ANTI-OVERTURNING IMPLEMENT VEHICLE

[75] Inventor: John W. Regier, Moundridge, Kans.

[73] Assignee: Excel Industries, Inc., Hesston, Kans.

[22] Filed: July 23, 1973

[21] Appl. No.: 381,533

Related U.S. Application Data

[62] Division of Ser. No. 218,741, Jan. 18, 1972, Pat. No. 3,792,748.

[52] U.S. Cl. .................. 172/4; 172/4.5; 172/276
[51] Int. Cl. ............................................. A01b 63/111
[58] Field of Search ............... 172/4.5, 4, 276, 705; 257/89; 180/104

[56] References Cited
UNITED STATES PATENTS

| | | | |
|---|---|---|---|
| 2,099,637 | 11/1937 | Wendel | 172/276 |
| 2,846,635 | 8/1958 | Shea | 172/4.5 X |
| 3,176,777 | 4/1965 | Bowie | 172/4 |
| 3,548,570 | 12/1970 | Knott et al. | 172/4 |
| 3,556,225 | 1/1971 | Matsuzaki | 172/4.5 |

Primary Examiner—Stephen C. Pellegrino
Attorney, Agent, or Firm—John A. Hamilton

[57] ABSTRACT

An anti-overturning system for an implement vehicle having a frame, a propelling engine, ground-engaging drive wheels at its sides, an operator's platform, and adapted to carry a ground-engaging implement at its forward end for vertical movement to follow ground contour, the system including automatic mechanism operable on laterally inclined ground to maintain the drive wheels, engine, and operator's platform in their normal upright position and to maintain the center of gravity of the engine and operator's platform laterally midway between the wheels so as to prevent lateral overturning, and mechanism operable to inhibit upward movement of said implement, or to exert a positive downward pressure on the implement, when the vehicle is headed downwardly on a slope, whereby to prevent forward overturning or tipping of the vehicle.

5 Claims, 8 Drawing Figures

ANTI-OVERTURNING IMPLEMENT VEHICLE

This is a division of application Ser. No. 218,741, filed 1/18/72, now U.S. Pat. No. 3,792,748.

This invention relates to new and useful improvements in implement vehicles such as are commonly used for operatively carry and propelling implements such as mowers, bulldozers, or scraper blades, snow plows, and the like, and has particular reference to a system for preventing the overturning of such vehicles when they must be operated on non-level terrain. The vehicle is illustrated herein as supporting and driving a mowing machine, but it will be understood that this particular implement is by way of example only.

Overturning of such vehicles when operating on non-level terrain is a common and well known cause of accidents, resulting in injury or even death for the operator, and most commonly occurs either where the vehicle is moving over terrain which slopes transversely to its direction of travel, or when it is headed downwardly on a steep slope. The laterally tilting occurs quite commonly, for example, when a mowing machine is used to mow the inclined walls of a highway drainage ditch or the like. Even when the slope is not sufficient to cause the vehicle to overturn or roll laterally, it may still create a sense of precarious imbalance in the operator, force him to strain to keep his seat, and cause fatigue. The forward tilting occurring on downslopes results from the fact that the implement, while usually disposed forwardly of the vehicle and sometimes even having its own ground-engaging wheels, so that it could prevent forward tipping of the vehicle if it were rigidly affixed to the vehicle, ordinarily cannot be attached rigidly to the vehicle, but must be vertically movable relative to the vehicle, in order to permit it to follow the ground contour, or to be elevated above the ground for transporation. Any free upward movability of the implement can result in forward rolling or overturning of the vehicle when headed downwardly on a steep slope, especially since both the implement and the operator should be disposed as close as possible to the forward end of the vehicle so that the operator can view the operation of the implement.

The object of the present invention, accordingly, is the provision of a system for preventing the overturning of the vehicle either laterally or forwardly as outlined above. The prevention of lateral overturning in accordance with the present invention, involves the provision of a mechanism for tilting the main vehicle drive wheels, the vehicle engine and the operator's platform laterally in a direction opposite to the direction of ground inclination, so that they remain in a normal upright position despite the slope of the ground, and so that their center of gravity remains laterally centered between the wheels. At the same time, the vehicle frame, and the implement carried thereby, tilt with the ground slope to maintain a proper operative relationship of the implement to the ground. The mechanism is automatic, functioning without the attention of the operator whenever the vehicle enters upon a laterally inclined slope, but the automatic feature may be over-ridden by manual controls whenever desired. The prevention of forward overturning involves the provision of a mechanism operable when actuated to resist upward movement of said implement, and if necessary to exert a strong but yieldable downward force on the implement, whereby to press said implement firmly against the ground to resist upward movement thereof relative to the vehicle, and thereby to resist forward rolling of the vehicle. This action also occurs automatically.

Other objects are simplicity and economy of construction, and efficiency and dependability of operation.

With these objects in view, as well as other objects which will appear in the course of the specification, reference will be had to the accompanying drawing, wherein.

Like reference numerals apply to similar parts throughout the several views, and the numeral 2 applies generally to the vehicle frame, said frame including a pair of side rails 4 of square cross-sectional contour which extend fore-and-aft of the vehicle, the rearward portions 6 of said side rails converging inwardly and being welded to a fore-and-aft extending center bar 8 of round cross-sectional contour. Said center bar carries a castered ground-engaging wheel 10 at its rearward end, and is offset downwardly just forwardly of said wheel, extending forwardly midway between the side rails, with a minimum clearance above the ground. Side rails 4 are angled downwardly at their forward ends, as indicated at 12, and a pair of vertical posts 14 are affixed at their upper ends respectively to said side rails intermediate the forward and rearward ends of the latter, and depend therefrom. The lower ends of posts 14 are rigidly interconnected by a horizontal cross bar 16 extending transversely therebetween, center bar 8 being welded to said cross bar. Forwardly of cross bar 16, center bar 8 is welded to the center point of a forwardly opening U-shaped yoke 18 (see FIGS. 2 and 5), the arms 20 of said yoke extending forwardly and being affixed respectively to the lower ends of the downturned forward end portions 12 of side rails 4, as by connectors 22 (see FIG. 2).

At each side of frame 2, adjacent the forward end thereof, there is disposed a ground-engaging drive wheel 24 each carried rotatably by its own wheel carrier 26, and driven by a hydraulic motor 28 mounted on said carrier. Said motors are each furnished with hydraulic fluid by a pair of flexible hoses 30. Said motors are powered by standard pump means, not shown, carried by the engine carriage, and controlled by standard means, also not shown except that said control means includes a pair of control levers 32 mounted on the operator's platform. Said levers each control one of the motors for forward and reverse propulsion of the vehicle at variable speeds, whereby the vehicle may be caused to move forwardly or rearwardly at any desired speed, and steered by operating said motors at different speeds. Each motor carrier 26 is carried in frame 2 for pivotal movement on a horizontal axis extending fore and aft of the vehicle, having at its forward end a stub axle 34 journalled in a bearing 36 carried at the lower end of the forward end portion 12 of the adjacent frame side rail, and a stub axle 38 at its rearward end journalled in a bearing 40 carried at the lower end of post 14 at that side of the frame.

A carriage platform 42 is disposed above and rests on center frame bar 8 behind frame cross bar 16, and a carriage platform 44 is supported similarly on center bar 8 forwardly of cross bar 16. Affixed to the lower surface of each of said platforms are a pair of angle irons including a pair of vertical parallel legs 46 depending at respectively opposite sides of center bar 8, in close proximity thereto, said legs being connected by bolts 48 extending tranversely beneath said center bar, whereby said platforms may be pivoted about said center bar. A gasoline engine 50, or other suitable prime mover, is mounted on platform 42. It will be understood that said engine drives all of the various hydraulic pumps of the system, as well as the implement to be carried by the vehicle. Affixed to platform 42, forwardly of engine 50, is an upstanding standard 52 of generally A-form, and an A-standard 54 is similarly affixed to and projects upwardly from platform 44. Standards 52 and 54 project above side rails 4 of the frame, and are welded or otherwise affixed at their upper ends to an operator's platform 56 which carries control levers 30 for propulsion motors 28, and an operator's seat 58. Thus platforms 42 and 44 are rigidly interconnected to form in effect a singled carriage platform, and operator's platform 56 tilts laterally about center bar 8 with said carriage platform.

Figure 2:
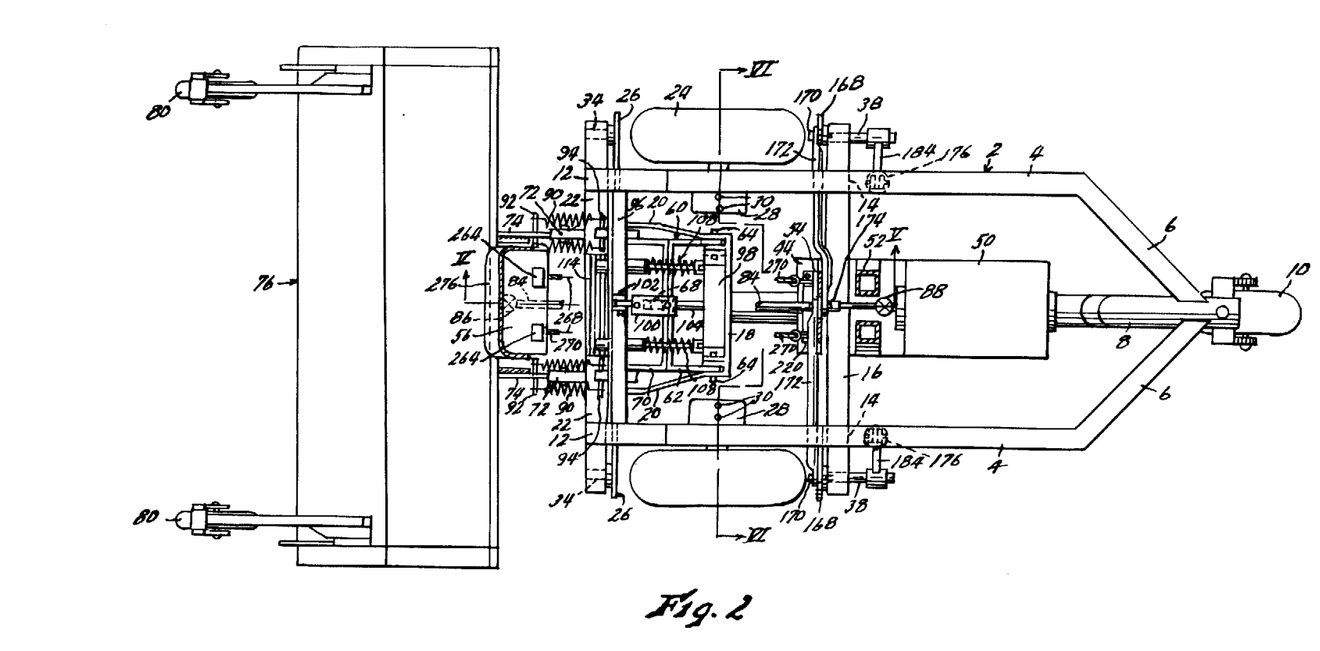
FIG. 2 is a sectional view taken on line II—II of FIG. 1.
Figure 3:
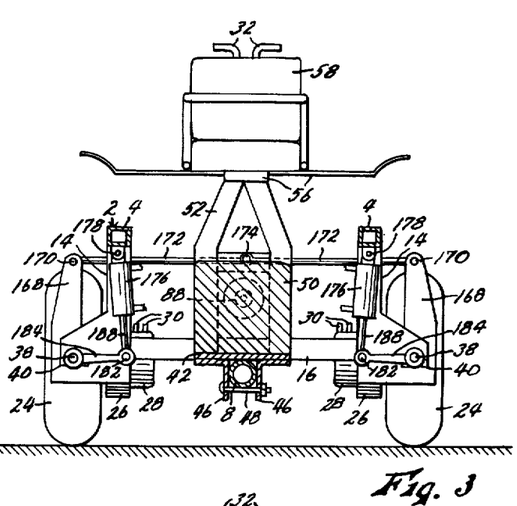
FIG. 3 is a sectional view taken on line III—III of FIG. 1.
Figure 5:
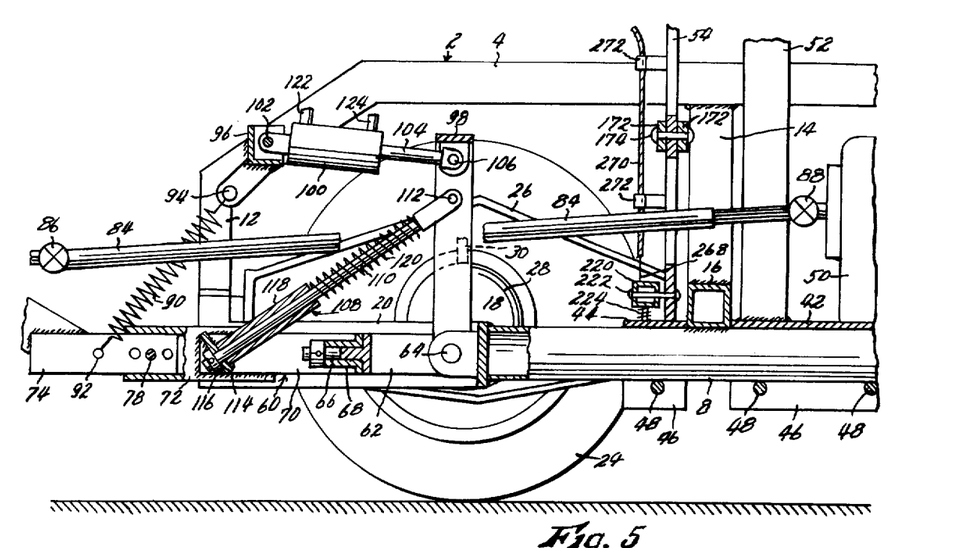
FIG. 5 is an enlarged, fragmentary sectional view taken on line V—V of FIG. 2, with parts left in elevation and partially broken away.
Figure 6:
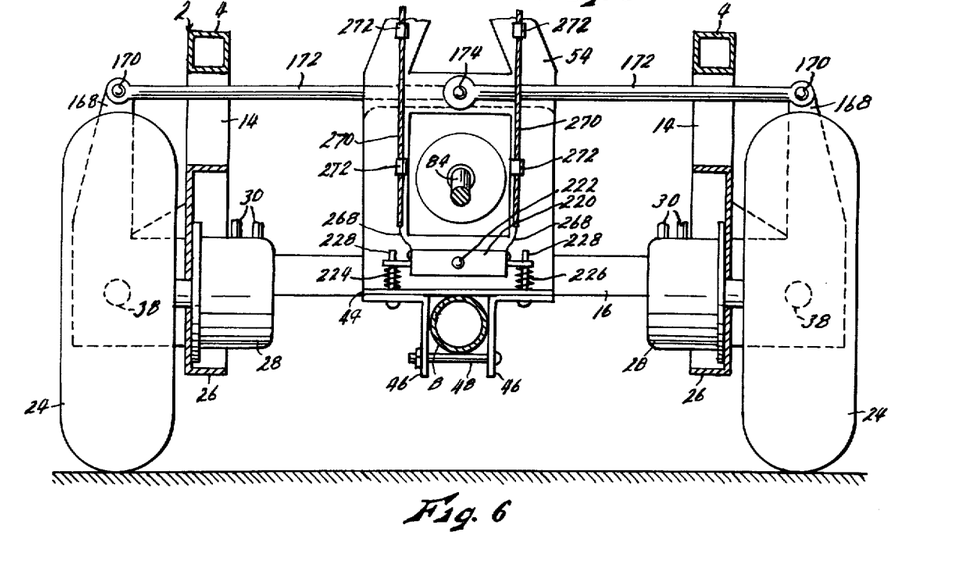
FIG. 6 is an enlarged sectional view taken on line VI—VI of FIG. 2, with parts left in elevation.

Mounted pivotally in yoke 18 of frame 2 is a tool bar indicated generally by the numeral 60. As best shown in FIGS. 2 and 5, said tool bar includes a rearwardly opening U-shaped clevis 62, the rearwardly extending arms of which are pivoted in yoke 18 on a horizontal transverse axis, as at 64. At its forward midpoint, said clevis carries a forwardly extending stub axle 66 on which is pivotally mounted the bearing member 68 of a forwardly opening U-shaped tool mount 70. Welded to the forwardly extending end portion of each of the arms of said tool mount is a sleeve member 72 into which a mounting tongue 74 of an implement 76 may be inserted, and releasably secured by bolt 78. This permits various implements to be mounted on the vehicle, as desired. The implement actually shown represents a mowing machine normally supported in proper relation to the ground level by its own castered wheels 80, but this is exemplary only. Pivot 64 of the tool bar permits the implement to follow the ground contour in the direction of vehicle travel, and pivot 66 permits it to adjust to the ground contour laterally of the vehicle. If implement 76 has operating parts requiring a power drive, it may be driven by a standard drive shaft 84 connected thereto by universal joint 86, and to engine 50 by universal joint 88. The weight of the implement may be partially supported, if desired, by a plurality of tension springs 90 attached at their lower ends to tongues 74, as at 92, then extending upwardly and rearwardly and attached as at 94 to a rigid cross bar 96 extending horizontally and transversely between the forward portions of frame side rails 4, and rigidly affixed thereto.

Tool bar 60 is controlled by a mechanism including a downwardly opening U-shaped lever 98 the legs of which are pivoted at their lower ends on pivots 64 of frame yoke 18, said lever being operable by a hydraulic cylinder 100 pivoted at its forward end, as at 102, to the midpoint of cross bar 96, and extending rearwardly therefrom. The piston rod 104 of said cylinder extends rearwardly, and is pivoted at its rearward end to the upper end of lever 98 as at 106 (see FIG. 5). Each vertical leg of lever 98 is connected to the corresponding arm of tool mount 70 by a forwardly and downwardly inclined yieldable link 108. As best shown in FIG. 5, each of links 108 includes a rod 110 pivoted at its upper end, as at 112, to the associated leg of lever 98, and extending downwardly and forwardly to project slidably through a hole provided therefor in a cross bar 114 extending horizontally and transversely between the forward ends of the arms of the tool mount, and rigidly affixed thereto. A collar 116 is affixed to said rod below said cross bar. A sleeve 118 is mounted slidably on the rod above the cross bar, and is urged against said cross bar by a compression spring 120 also mounted on said rod. It will be seen that the two yieldable links 108 are disposed respectively at laterally opposite sides of tool bar pivot 66, so as to bias the tool bar and the implement carried thereby, toward a laterally level position with respect to frame 2.

Thus, when piston rod 104 is extended, it acts through lever 98, link rods 110 and collars 116 to pivot tool bar 60 upwardly about pivot 64, thereby elevating implement 76 above the ground for transportation. When piston rod 104 is retracted, it acts through lever 98 to compress link springs 120, moving collars 116 away from cross bar 114, thereby exerting a strong downward pressure on the tool bar to urge implement 76 against the ground. If the piston of cylinder 100 is "free-floating," that is, free to move in the cylinder without hydraulic resistance, lever 98 and links 108 become inoperative, and tool bar 60 and implement 76 can pivot freely about pivot 64. This is of course to be desired in ordinary operation since it permits implement 76 to follow the ground contour.

Figure 8:
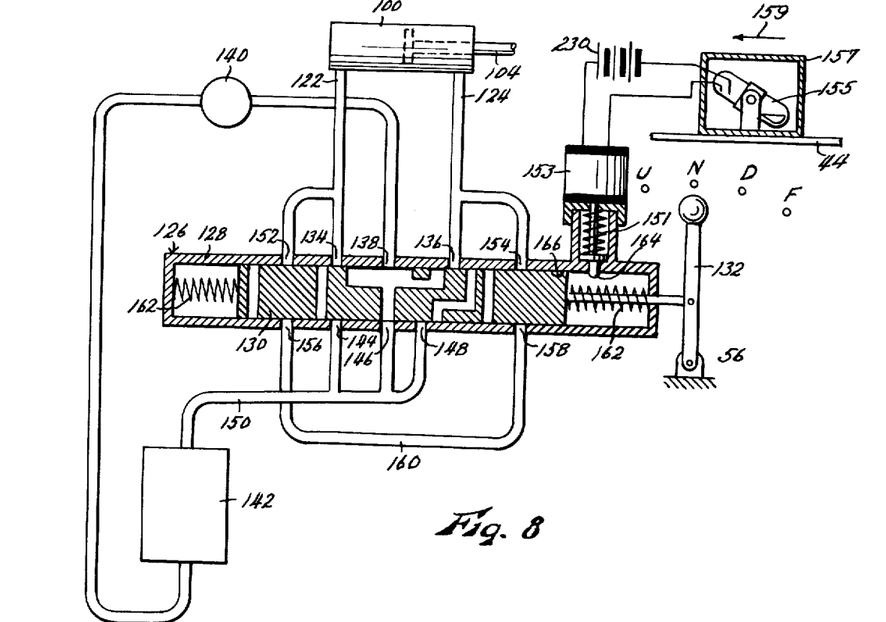
FIG. 8 is a schematic layout of the control system of the implement hold-down mechanism.

Cylinder 100 having double-acting, havingn hydraulic supply hoses 122 and 124 at respectively opposite ends thereof, and is controlled by a system diagrammed in FIG. 8. Said system includes a control valve 126 including a valve body 128 and a spindle 130 slidable in said body by manual movement of a control lever 132, which it will be understood is disposed on operator's platform 56 conveniently to seat 58. Hoses 122 and 124 of cylinder 100 are connected into valve body 128 as shown, at ports 134 and 136. Hydraulic fluid is delivered to inlet port 138 of the valve body by a hydraulic pump 140, powered by engine 50, from a reservoir 142, and outlet ports 144, 146, and 148 of the valve body are connected to the reservoir by return conduit 150. The valve body also has ports 152 and 154 connected respectively to ports 134 and 136 exteriorly of the valve body, and ports 156 and 158 connected by a conduit 160 exterior to the valve body. All of the valve body ports are controlled by valve spindle 130.

Spindle 130 has a neutral position, in which it is shown in the drawing, to which it is resiliently biased by centering springs 162, and which corresponds to the indicated N position of lever 132. At this position the spindle connects inlet port 138 and outlet port 146, so that pump 140 operates without load, but in which ports 152, 134, 136, and 154 are blocked, so that cylinder 100 is sealed and piston rod 104 is locked in position. A careful consideration of FIG. 8 will reveal that when spindle 130 is moved to the left as shown, to the up or U position of lever 132, the spindle will close outlet port 146, but will simultaneously connect inlet port 138 to port 134 to deliver fluid to the forward end of cylinder 100 to extend piston rod 104 and connect ports 136 and 148, whereby fluid from the rearward end of cylinder 100 is exhausted to the reservoir. This elevates tool bar 60 and implement 76 as already described. When they have been elevated as high as desired, they may be locked at that position by allowing lever 132 to return to its N postion. Conversely, when lever 132 is moved in the opposite direction to its D position, valve spindle 130 is moved to the right, connecting port 138 and 136 to deliver fluid to the rearward end of cylinder 100 to retract piston rod 104, and connecting ports 134 and 144 to exhaust fluid from the forward end of the cylinder to the reservoir. This causes springs 120 to exert a downward pressure on tool bar 60 as already described, pressing implement 76 against the ground. When the desired pressure has been attained, the system may again be locked by allowing lever 132 to return to its N position.

When lever 132 is moved still further to the right to its F position, spindle 130 connects ports 138 and 148 so that pump 140 operates without load, and seals ports 134 and 136, but connects port 152 with port 156, and port 154 with port 158, so that fluid can flow freely from one end of the cylinder to the other through bypass conduit 160. The piston of cylinder 100 is then free-floating, permitting tool bar 60 and implement 76 to pivot freely to follow the ground contour. Since this is the normal condition in operation in operation on level terrain, a spring loaded detent 164 is provided in the wall of valve body 128, engageable in a notch 166 of springle 130 to hold lever 132 releasably in its F position. While detent 164 may be released by manual pressure on lever 132, due to the rounded contour of the detent and its notch, it may also be retracted against its spring 151 by the energization of a solenoid coil 153, which is connected in series with battery 230 or any other suitable source of electric power, and a tilt-sensitive mercury switch 155 mounted in a housing 157 carried, for example, on platform 44. Arrow 159 in FIG. 8 points toward the forward end of the vehicle. Thus whenever the vehicle tilts forwardly sufficiently to close switch 155, detent 164 is released and valve spindle 130 is returned to its neutral or "cylinder locking" position by centering springs 162. This automatic action should be set, by proper adjustment of the operating angle of mercury switch 155, to occur just before the vehicle is tiled far enough forwardly to create the danger that it might tip over forwardly. Since it "locks" cylinder 100 with the implement wheels 80 against the ground, tool bar 60 cannot pivot upwardly except to the slight degree permitted by links 108, and against the resistance of springs 120 of said links, and the vehicle is thereby braced against tipping over forwardly. In some cases of extreme forward tilt, springs 120 may yield somewhat, causing rear wheel 10 to be elevated slightly from the ground, but due to the limited yield of links 108 even maximum yielding thereof will not permit the vehicle to capsize, and the condition can be corrected, again lowering wheel 10 to the ground, by moving lever 132 to its D position to retract piston rod 104 to exert as strong a downward force as may be required on the tool bar. Switch 155 is mounted on carriage 44, or some other element maintained substantially level transversely of the vehicle by the transverse levelling mechanism to be described, in order that its operating angle will not be affected by transverse tilting of the vehicle.

Figure 4:
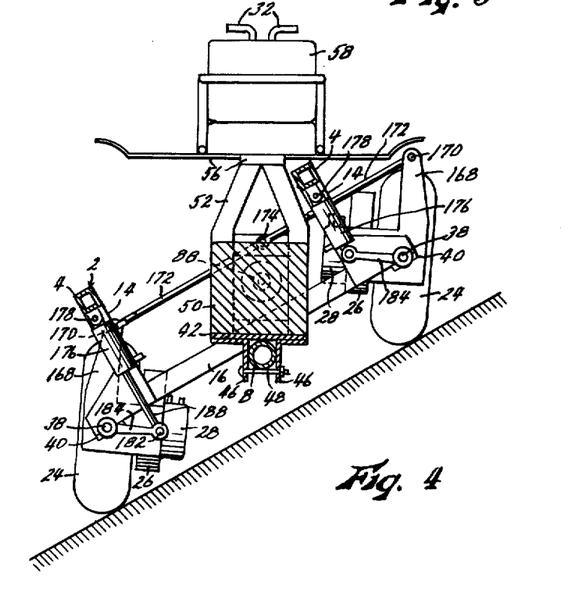
FIG. 4 is a view similar to FIG. 3, but with the vehicle positioned on terrain inclined laterally to the direction of vehicle travel.

Referring next to the machanism for tilting drive wheels 24 and carriage platform 42–44 laterally relative to frame 2, it will be seen that each wheel carrier 26 is provided at its rearward end with an upwardly projecting crank arm 168. Pivoted to the upper end of each of said cranks, as at 170, is the outer end of a generally horizontal link 172. The links 172 of the two cranks extend inwardly beneath side frame rails 4, and are both pivotally connected at their inner ends to forward A-standard 54 at a single pivot point 174, directly above center frame bar 8. Thus the two wheel carriers 26, as well as carriage platform 42–44, are connected together and forced to pivot laterally of the frame in substantially equal degrees. The pivoting power is supplied by a pair of double-acting hydraulic cylinders 176, each of said cylinders being pivoted, as at 178, to one of side frame rails 4 just behind post 14 thereof, and having a piston rod 180 extending downwardly therefrom and pivoted at its extended end, as at 182, to the movable end of a crank 184 affixed to and projecting from the rearwardly extended end portion of the rear stub axle 38 of the wheel carrier 26 at that side of the frame. Thus when the vehicle enters on laterally sloping terrain, as shown in FIG. 4, and the cylinder 176 at the low side of the vehicle is extended and the cylinder 176 at the high side of the vehicle is retracted, as shown, said cylinders act through cranks 184 to pivot wheel carriers 26 on their axles 34 and 38, whereby to maintain drive wheels 24 substantially in upright, vertical planes despite the slope of the ground, and the wheel carriers, acting through cranks 168 and links 172, cause carriage platform 42–44 to pivot about center frame bar 8 in the same angular direction, and to substantially the same degree, as the wheel carriers have been pivoted. Thus the carriage platform, as well as the engine 50 and operator's platform 56 carried thereby, remain upright and level despite the slope of the ground, and the center of gravity of these parts is maintained laterally midway between the planes of the drive wheels. Thus the vehicle is far less likely to roll over laterally even on steeply sloping ground than it would otherwise be, and the operator's seat 58 remains level so that he retains his seat easily and has no sense of imbalance. At the same time implement 76, being mounted on frame 2 which does tilt with the ground level, is still free to follow the ground contour as on level terrain.

Figure 7:
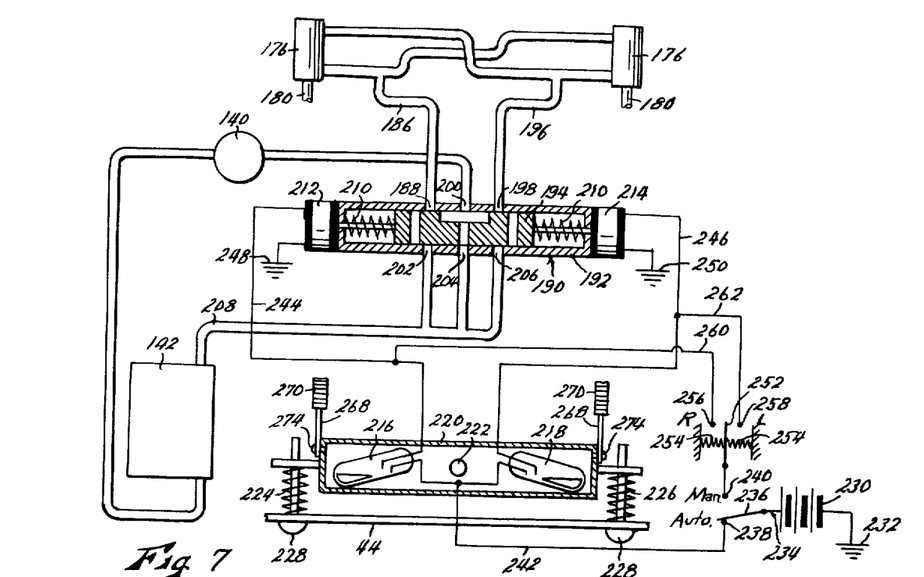
FIG. 7 is a schematic layout of the control system of the transverse tilting mechanism.

Levelling cylinders 176 are controlled by an automatic mechanism diagrammed in FIG. 7. The upper end of one cylinder and the lower end of the other are connected by a conduit 186 to a port 188 of a valve 190 having a valve body 192 in which a vale spindle 194 is reciprocally mounted, and the opposite ends of said cylinders are connected by a conduit 196 with another port 198 of the valve. Fluid is delivered to port 200 of the valve by pump 140. The valve also has three outlet ports 202, 204, and 206, connected to reservoir 142 by a return conduit 208. All of the ports are controlled by spindle 194, which has a neutral position, as shown, wherein cylinder ports 188 and 198 are sealed to lock cylinders 176 in position, but port 200 is connected to port 204 so that pump 140 may operate without load. Said spindle is biased to this neutral position by centering springs 210, but may be moved to the left by the energization of a solenoid 212, or to the right by the energization of solenoid 214. When moved to the left, spindle 194 connects ports 200 and 188 to deliver fluid through conduit 186 to one end of each cylinder 176, and connects port 198 and 206 so that fluid from the opposite ends of the cylinders is exhausted to the reservoir through conduit 196. When moved to the right, the spindle connects ports 200 and 198 to deliver fluid to the cylinders through conduit 196, and connects ports 188 and 202 to exhaust fluid from conduit 186 to the reservoir. Thus the carriage and wheels are in one case tilted to the right relative to the frame, as in FIG. 4, and in the other case are tilted to the left.

Solenoids 212 and 214 may be controlled by a pair of tilt-sensitive mercury switches 216 and 218 (see FIG. 7) mounted in a switch housing 220 mounted for pivotal movement about an axis longitudinal to the vehicle, as by pin 222, on forward A-standard 54, just above carriage platform 44, but normally maintained yieldably stationary and level, relative to the platform, by a pair of levelling springs 224 and 226 carried on pins 228 fixed in platform 44 adjacent respectively opposite ends of switch housing 220 and extending vertically upwardly therefrom for sliding engagement with said housing. Said springs are yieldable to permit tilting of said housing in either direction. Switch 216 closes whenever housing 220 tilts to the right, as viewed in FIG. 7, and switch 218 closes whenever the housing tilts to the left, while both are open when the housing is level. Electric current is derived from a power source, which may be a battery 230 one terminal of which is grounded at 232, through a wire 234 to a manually operable selector switch 236 closable selectively on either of contacts 238 or 240. Contact 238 is connected by wire 242 to one terminal of each of switches 216 and 218, and the opposite terminals of switches 216 and 218 are connected by wires 244 and 246 to one terminal each of solenoids 212 and 214 respectively, the opposite terminals of said solenoids being grounded respectively at 248 and 250. Contact 240 of switch 236 is connected to a manually operable switch 252 which is normally held open by springs 254, but which can be manually closed on either of two contacts 256 or 258 respectively. Contacts 256 and 258 are connected respectively to wires 244 and 246 by wires 260 and 262.

As long as switch 236 is closed on contact 238, the levelling is automatic. That is, whenever the vehicle enters on transversely sloping terrain, one or the other of mercury switches 216 or 218 will close, actuating one or the other of solenoids 212 or 214 to position the spindle of valve 190 to operate cylinders 176 to tilt carriage platform 42–44, and wheel carriers 26, in a direction relative to frame 2 opposite to the direction of tilt of the frame 2 itself, thereby maintaining wheels 24 in generally vertical planes, and maintaining carriage 42–44 level, engine 50 upright, operator's platform 56 level, and seat 58 upright. Furthermore, the center of gravity of the carriage and the parts carried thereby is maintained essentially in a vertical plane midway between the planes of wheels 24.

When the carriage has tilted sufficiently to level the parts it carries, the switch 216 or 218 theretofore closed will open, returning the system to rest and allowing spindle 194 of valve 190 to be returned to its cylinder-locking neutral position by centering springs 210, so that the carriage tilt will remain constant until the lateral slope of the group again changes. When selector switch 236 is closed on contact 240, the carriage tilting is manually controlled by operation of switch 252, mercury switches 216 and 218 then being inoperative. Solenoids 212 and 214 may then be selectively energized, and the levelling cylinders thereby actuated, by manual closure of switch 252 on either of its contacts 256 or 258. Manual operation may be desired whenever, for any reason, it may be desired to maintain the carriage in any position other than its normal upright attitude, and also provides a stand-by operation in the event of any malfunction of the mercury switches.

Figure 1:
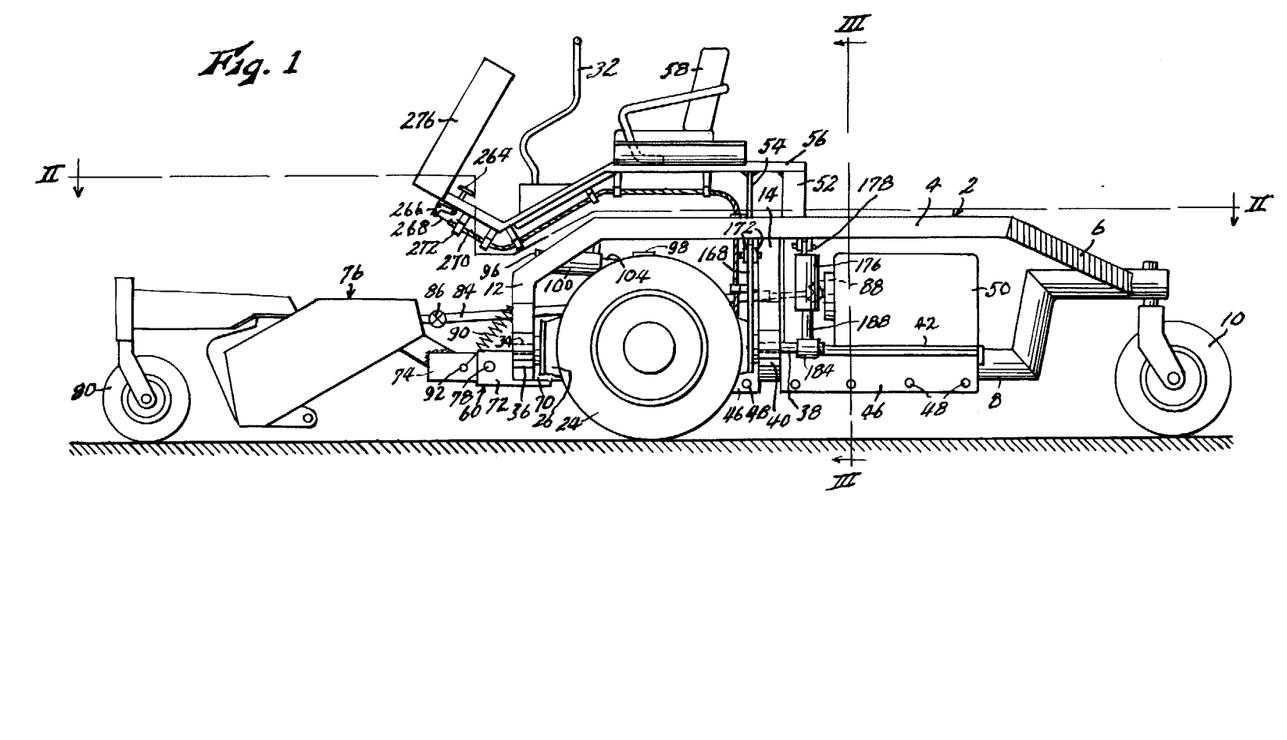
FIG. 1 is a side elevational view of an implement vehicle embodying the present invention, with a mowing machine mounted operatively thereon.

Actually, it is generally desirable to set mercury switches 216 and 218 with a certain lack of sensitivity, that is, so that the vehicle can tilt from side to side in some degree before they bring cylinders 176 into play to level the carriage. This prevents a jerky "hunting" action of the levelling cylinders which otherwise would occur as a result of even minute localized variations of ground inclination on otherwise generally level terrain, and which most operators find objectionable. However, this lack of sensitivity of the mercury switches can also result in the fact that the carriage may be off-level, though only slightly, before the levelling cylinders function, and many operators find this to be objectionable also, particularly when ground conditions may cause it to persist for long periods. Therefore, to permit "trimming" of the carriage level, whenever desired, but without sacrificing automatic control, there are provided a pair of foot pedals 264 (see FIGS. 1 and 2) carried by operator's platform 56 at a position convenient to the feet of an operator occupying seat 58. Each of said pedals, through a bell-crank lever 266 mounted beneath platform 56, operates a cable drive consisting of a wire 268, one end of which is attached to lever 266, carried slidably in a flexible conduit 270. Conduits 270 extend rearwardly beneath platform 56 and downwardly in front of forward A-standard 54, being attached to these members by suitable spaced brackets 272, terminating just above switch housing 220, with wires 268 extending therefrom and being attached, as best shown in FIG. 7, to switch housing 220 at respectively opposite sides of the pivot 222 of said housing. The attachments are indicated at 274. Thus, by momentarily depressing the appropriate one of pedals 264, the operator can pivot housing 220 on pivot 222 in either direction, against the pressure of levelling springs 224 or 226. This produces and "artificial" signal to the mercury switches that the carriage is tilted, and thereby actuates cylinders 176 to level it. The carriage can be tilted to any desired degree by this method, the degree of tilt being limited only by the degree to which switch housing 220 may be pivoted. At the same time, mercury switches 216 and 218 remain fully operative in their automatic operation. Switches 236 and 252 are preferably mounted on a dashboard member 276 carried by platform 56.

Another use of the pedal operation compensates for a practical limitation of the hydraulic levelling system, which is that it is not considered practical to provide a hydraulic system which will level the carriage as fast as the ground level can change in extreme conditions. The ground level change may in some cases be virtually instantaneous, as when one of wheels 24 drops into a ditch. With the pedal operation, the operator can, if he looks forwardly and sees that there will be a very sudden change of lateral ground slope at a certain point, "anticipate" the change by pressing the appropriate pedal 264 to initiate tilting of the carriage in the desired direction before that point, so that when the slope change does occur, the tilting of the carriage and wheels will be already completed or partially completed, so that there is no danger of lateral rolling of the vehicle.

The operation of my invention is considered to have been fully described in connection with the description of its structure. The implement hold-down action provided by cylinder 100 prevents forward overturning of the vehicle when the vehicle is headed downwardly on a slope, and the levelling action of cylinders 176 prevents lateral overturning of the vehicle on laterally sloping ground. Ground slopes of at least 30° can be negotiated quite safely. The hold-down action of cylinder 100 of course requires that implement 76 have elements engaging the ground. As shown, these ground-engaging elements may constitute implement wheels 80, or they may be other ground-engaging elements of the implement, such as the scraper blades of bulldozers and snow plows. With reference to cylinders 176, it will be seen that either of them could function alone to produce the desired result, although two cylinders have been found to produce a better balance of forces and less severe strains. If a single cylinder 176 were used, conduits 186 and 196 of FIG. 7 would of course be connected respectively to the opposite ends of the single cylinder.

While I have shown and described a specific embodiment of my invention, it will be readily apparent that many minor changes of structure and operation could be made without departing from the spirit of the invention.

What I claim as new and desire to protect by letters Patent is:

1. An implement vehicle comprising:
 a. a frame supported for movement over the ground by power-driven ground-engaging wheels,
 b. means for mounting an implement on said frame to be disposed forwardly of said ground-engaging wheels, said implement having ground-engaging elements, and said mounting means comprising a forwardly extending tool bar pivoted at its rearward end in said frame on a horizontal transverse axis, said implement being affixed to the forward end of said tool bar, and
 c. locking means interconnecting said frame and said tool bar and operable when actuated to resist upward pivotal movement of said tool bar, and
 d. actuating means carried by said frame and operable to actuate said locking means, said actuating means being automatic, including a tilt-sensitive device mounted on said vehicle frame and operable responsively to downward and forward tilting of said frame to actuate said locking means whenever said vehicle frame tilts downwardly and forwardly to a pre-determined degree.

2. A vehicle as recited in claim 1 with the addition of manual means carried by said frame and operable to control said actuating means independently of said tilt-sensitive device.

3. A vehicle as recited in claim 1 with the addition of power means carried by said frame and operable to pivot said tool bar selectively upwardly or downwardly, said power means including a double-acting hydraulic ram having control means including a manually movable control member having first and second positions in which it causes movement of said hydraulic ram in respectively opposite directions, a third position in which said ram is hydraulically locked against movement in either direction, and a fourth position in which said ram is hydraulically unrestrained and can move freely in either direction, and a detent cooperating with said control member and operable when engaged to retain said control member releasably in said fourth position, said locking means constituting resilient means operable to return said control member to said third position whenever said detent is released.

4. A vehicle as recited in claim 3 with the addition of release means operable when energized to release said detent, said tilt-sensitive device being operable to energize said release means whenever said vehicle frame is tilted forwardly to a pre-determined degree.

5. A vehicle as recited in claim 3 wherein said power means additionally includes:
 a. a lever pivoted in said frame and extending above said tool bar, and
 b. a resiliently compressible link extending between and interconnecting said lever and said tool bar at points thereof remote from the pivotal connection of said tool bar to said frame, whereby when said lever is pivoted in one direction said link is compressed to exert a yielding downward pressure on said tool bar, and when said lever is pivoted in the opposite direction said tool bar is pivoted upwardly, said ram interconnecting said vehicle frame and said lever and being operable to pivot said lever selectively in either direction.

* * * * *